United States Patent [19]
Turner et al.

[11] 3,742,021
[45] June 26, 1973

[54] NEW DERIVATIVES OF GLYCYRRHETINIC ACID

[75] Inventors: John Cameron Turner, Kent; Michael Christopher Sleep, London, both of England

[73] Assignee: Biorex Laboratories Limited, London, England; by said turner

[22] Filed: Dec. 23, 1969

[21] Appl. No.: 887,778

[30] Foreign Application Priority Data
Jan. 17, 1969   Great Britain..................... 2,847/69

[52] U.S. Cl........ 260/468.5, 260/348 A, 260/514.5, 424/305, 424/317
[51] Int. Cl........................ C07c 61/36, C07c 61/74
[58] Field of Search...................... 260/468.5, 514.5

[56] References Cited
OTHER PUBLICATIONS

Mousseron – Canet et al. Bull. de la Societe Chimique de France, 1968, p. 3023 (1968).
Elgamal et al. Acta Chem. (Budapest) 58, 75 (1968).

*Primary Examiner*—Lorraine A. Weinberger
*Assistant Examiner*—Robert Gerstl
*Attorney*—Wenderoth, Lind & Ponack

[57]   ABSTRACT

There are provided new glycols and chlorhydrins derived from glycyrrhetinic acid which have low toxicities as well as good anti-inflammatory, anti-arthritic and anti-ulcer properties.

3 Claims, No Drawings

NEW DERIVATIVES OF GLYCYRRHETINIC ACID

BACKGROUND OF THE INVENTION

Glycyrrhetinic acid is known to have valuable anti-inflammatory properties as have also several of its known derivatives. There is, however, a need for new compounds which have very low acute and chronic toxicities which exhibit anti-inflammatory properties and also anti-arthritic and anti-ulcer properties.

SUMMARY OF THE INVENTION

Thus, according to the present invention there are provided new derivatives of glycyrrhetinic acid of the general formula:

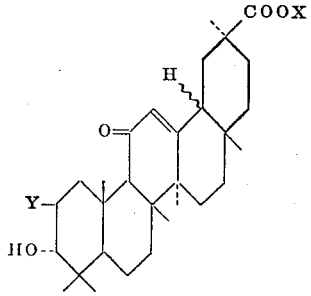

(I)

wherein X is a hydrogen atom or a straight or branched, saturated or unsaturated aliphatic radical which preferably contains up to 6 carbon atoms and Y is a hydroxyl group or a chlorine atom.

Preferred examples of aliphatic radicals X include methyl, ethyl, isopropyl, n-propyl, n-butyl, n-hexyl, vinyl, allyl and propargyl radicals.

DETAILED DESCRIPTION OF THE INVENTION

As starting materials for the preparation of the new derivatives of glycyrrhetinic acid of general formula (I), there are used epoxy compounds of the general formula:

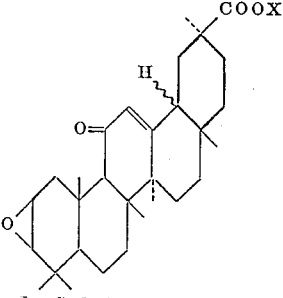

(II)

wherein X has the same meaning as above. These compounds of general formula (II) are described and claimed in our application Ser. No. 834,889, filed on the 19th June, 1969 now abandoned.

In order to obtain a compound (I) in which Y is a chlorine atom, a compound (II) is dissolved in an inert organic solvent, such as chloroform or tetrahydrofuran, and reacted with hydrogen chloride.

In order to obtain a compound (I) in which Y is a hydroxyl group, a compound (II) is hydrolysed with water, preferably with an aqueous organic and/or inorganic acid.

When products are obtained in which X is a hydrogen atom then, if desired, the corresponding esters can be prepared therefrom in known manner, for example, by reaction with an appropriate diazo compound.

The following Examples are given for the purpose of illustrating the present invention:

EXAMPLE 1

Methyl 2-chloro-3-hydroxy-11-oxo-18α-olean-12-ene-30-oate.

10 g. methyl 2,3-epoxy-11-oxo-18α-olean-12-ene-30-oate are dissolved in 200 ml. chloroform and gaseous hydrogen chloride slowly bubbled through the solution for 3 hours. The solution is then evaporated to dryness at 30°C. under reduced pressure and methanol added to the resultant gum. There are obtained 8.1 g. of crystalline material with a melting point of 232° – 235°C. After recrystallising twice from methanol/dichloromethane, there is obtained methyl 2-chloro-3-hydroxy-11-oxo-18α-olean-12-ene-30-oate with a melting point of 250° – 251°C.

EXAMPLE 2

Methyl 2,3-dihydroxy-11-oxo-18α-olean-12-ene-30-oate 15 g. methyl 2,3-epoxy-11-oxo-18α-olean-12-ene-30-oate are refluxed for 2 hours in a mixture of 525 ml. formic acid, 125 ml. water and 8 ml. concentrated sulphuric acid. Water is then added to the reaction mixture and 13 g. of solid material are obtained by filtration. This material is then heated to 70°C. for 30 minutes in a mixture of 100 ml. methanol and 100 ml. 10 percent aqueous sodium hydroxide solution, followed by acidification. The product is filtered off: this is 2,3-dihydroxy-11-oxo-18α-olean-12-ene-30-oic acid. This free acid is then converted into the corresponding methyl ester by reaction either with diazomethane or with methanol and sulphuric acid. There are obtained 7 g. methyl 2,3-dihydroxy-11-oxo-18α-olean-12-ene-30-oate, which has a melting point of 281° – 282°C.

EXAMPLE 3

2,3-Dihydroxy-11-oxo-18β-olean-12-ene-30-oic acid 10 g. 2,3-epoxy-11-oxo-18β-olean-12-ene-30-oic acid (m.p. 270° – 280°C.) are dissolved in 100 ml. tetrahydrofuran and 2 ml. 30 percent aqueous perchloric acid added thereto. After 3 hours, ethanol and water are added to the reaction mixture and the mixture then evaporated under reduce pressure. After recrystallisation of the material thus obtained from benzene/methanol, there are obtained 6.7 g. 2,3-dihydroxy-11-oxo-18β-olean-12-ene-30-oic acid, which has a melting point of 319° – 321°C.

EXAMPLE 4

2-Chloro-3-hydroxy-11-oxo-18β-olean-12-ene-30-oic acid 20 g. 2,3-epoxy-11-oxo-18β-olean-12-ene-30-oic acid are dissolved in the minimum amount of chloroform and added to 700 ml. of saturated ethereal hydrogen chloride. After leaving for 2 days at a temperature of 60° – 80°C., petroleum ether is added thereto and the diethyl ether boiled off. The product which separates is filtered off and recrystallised twice from petroleum ether/dichloromethane to give 9 g. 2-chloro-3-hydroxy-11-oxo-18β-olean-12-ene-30-oic acid, which has a melting point of 264° – 265°C.

The present invention also includes within its scope pharmaceutical compositions containing the new glycyrrhetinic acid derivatives. These pharmaceutical compositions can be administered orally or parenterally in admixture with a solid or liquid pharmaceutical carrier.

Solid compositions for oral administration include compressed tablets, pills, dispersible powders and granules. In such solid compositions, one of the new derivatives is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the present invention, for oral administration, include capsules of absorbable material, such as gelatine, containing one of the new derivatives, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active material in the compositions of the present invention may be varied, it being necessary that it should constitute a proportion such that a suitable dosage for the desired therapeutic effect shall be obtained. In general, the preparations of the present invention should be administered orally or parenterally to humans to give 10 to 1000 mg., preferably 50 – 500 mg. of active substance per day.

The following Examples illustrate pharmaceutical compositions according to the present invention:

EXAMPLE 5

250 mg. tablets are prepared containing:

| | |
|---|---|
| 2,3-dihydroxy-11-oxo-18β-olean-12-en-30-oic acid | 50 mg. |
| starch | 100 mg. |
| lactose | 95 mg. |
| magnesium stearate | 5 mg. |

EXAMPLE 6

400 mg. tablets are prepared containing:

| | |
|---|---|
| Methyl 2-chloro-3-hydroxy-11-oxo-18α-olean-12-en-30-oate | 100 mg. |
| starch | 130 mg. |
| lactose | 160 mg. |
| magnesium stearate | 10 mg. |

The compositions according to Examples 5 and 6 are intended for oral administration to humans for the treatment of ulcerative conditions of the gastric mucosa.

We claim:

1. A compound of the formula

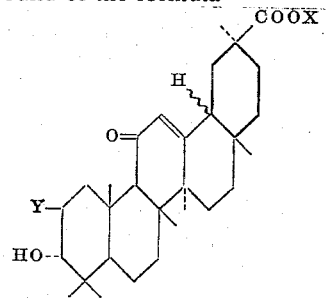

wherein X is a member selected from the group consisting of a hydrogen atom and straight and branched, saturated and unsaturated aliphatic radicals containing up to six carbon atoms and Y is a chlorine atom.

2. A compound according to claim 1, namely 2-chloro-3-hydroxy-11-oxo-18β-olean-12-ene-30-oic acid.

3. A compound according to claim 1, namely methyl 2-chloro-3-hydroxy-11-oxo-18α-olean-12-ene-30-oate.

* * * * *